Sept. 25, 1962  A. W. BRUNNER ET AL  3,055,196
APPARATUS AND METHOD FOR MAKING PILE FABRIC
WITH VARYING HEIGHT OF PILE Filed April 27, 1960  7 Sheets-Sheet 1

INVENTORS
ADAM W. BRUNNER
WILLIAM J. KOCH
BY
*Paul M. Phillips*
ATTORNEY

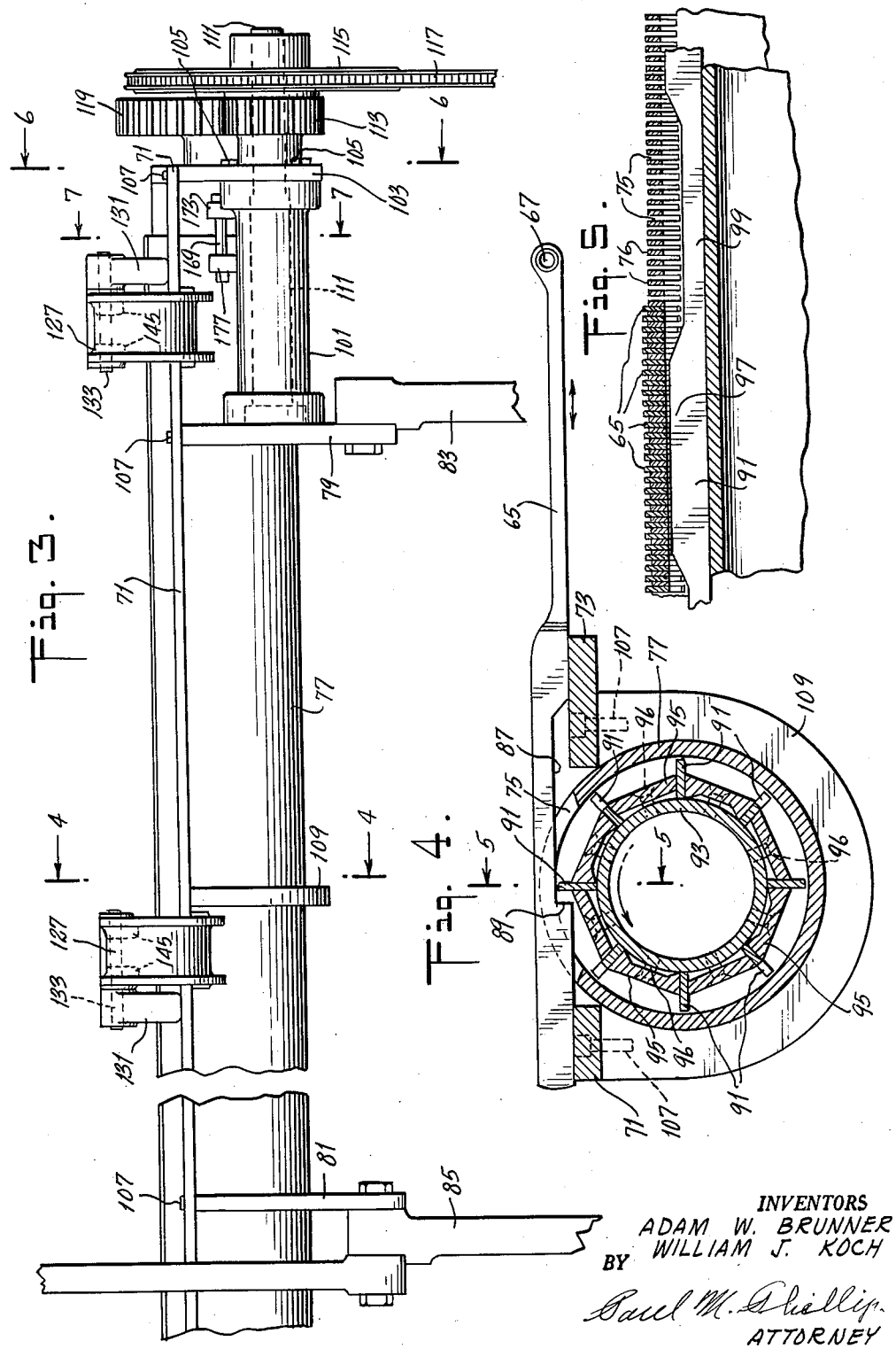

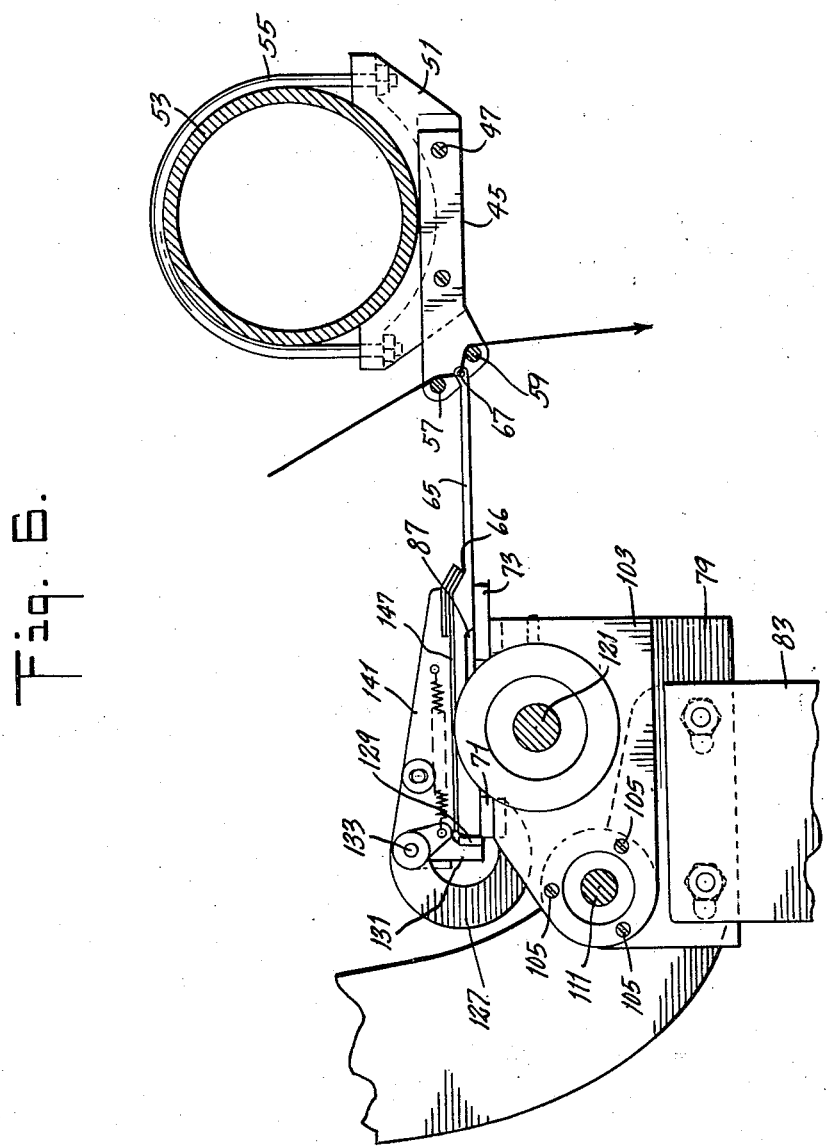

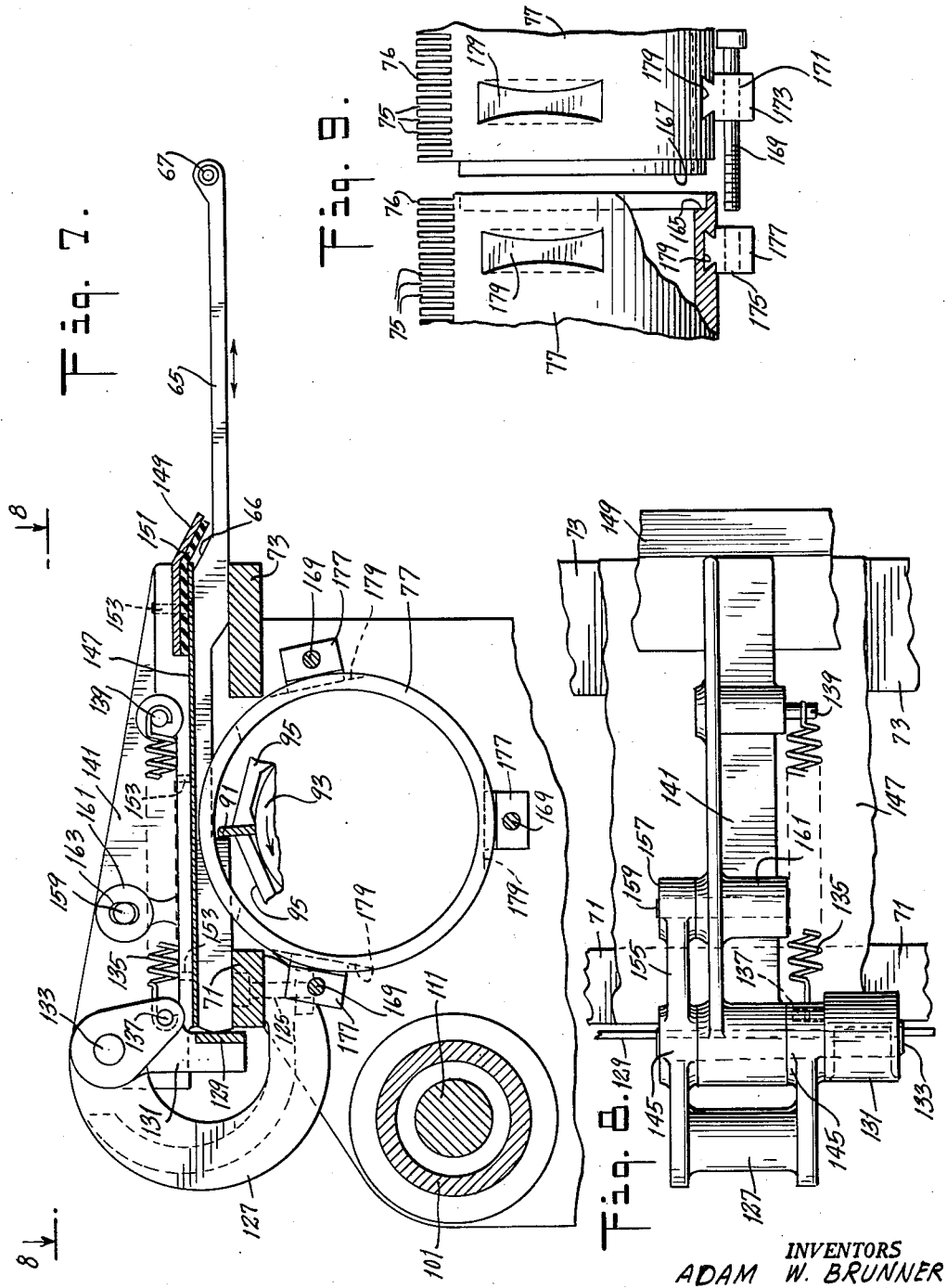

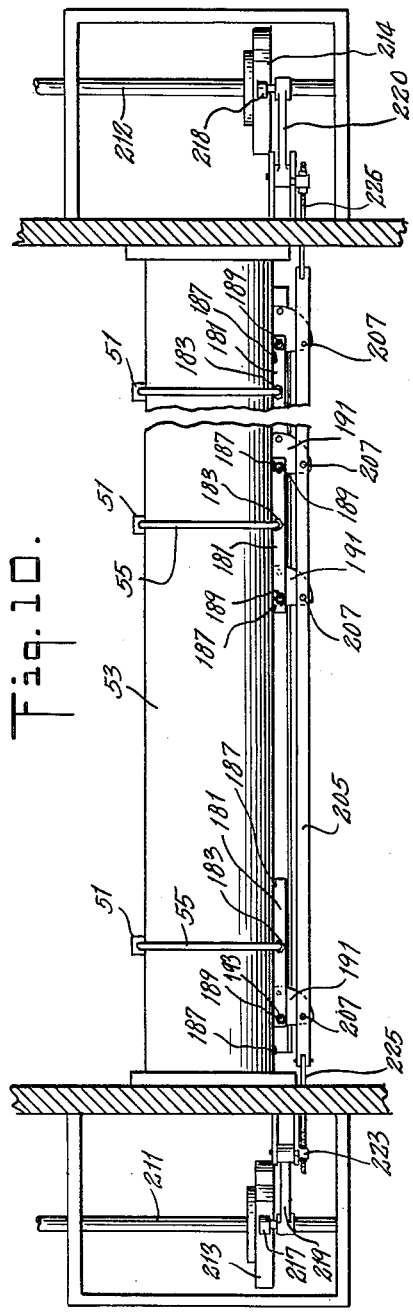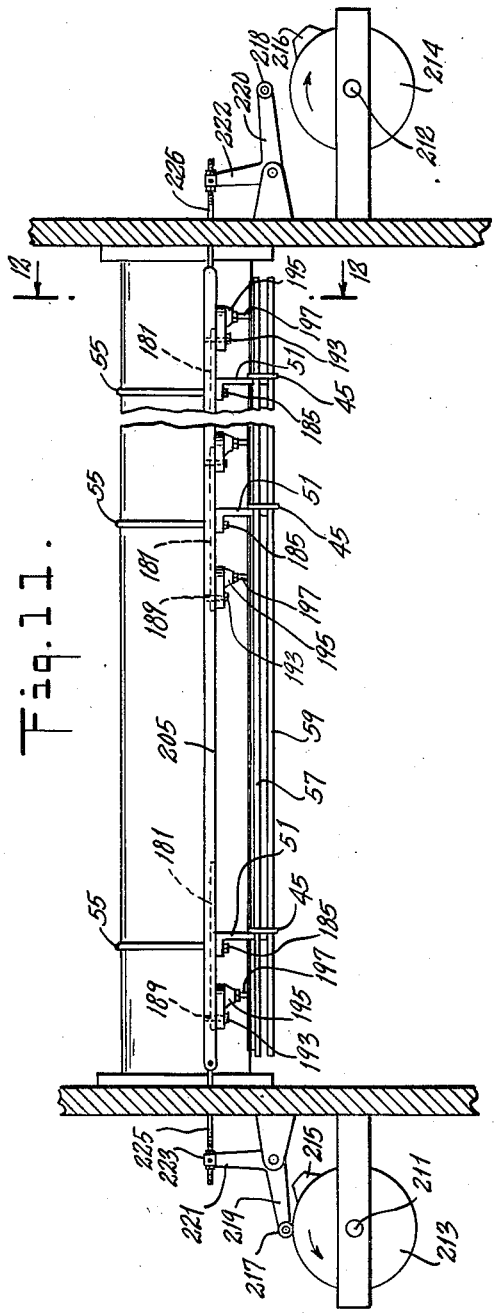

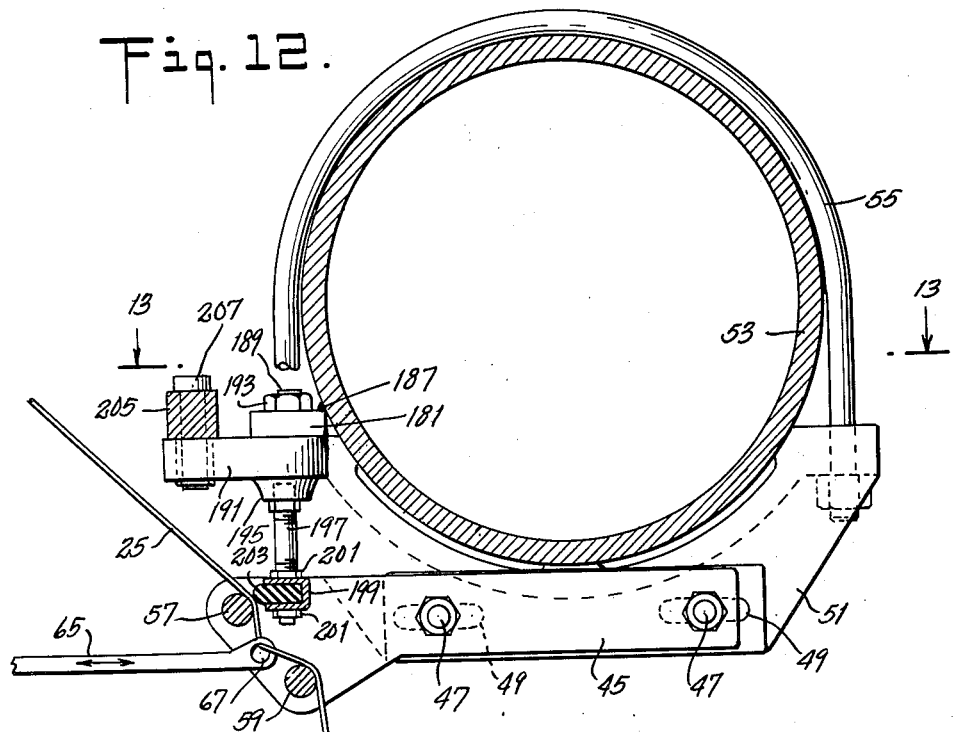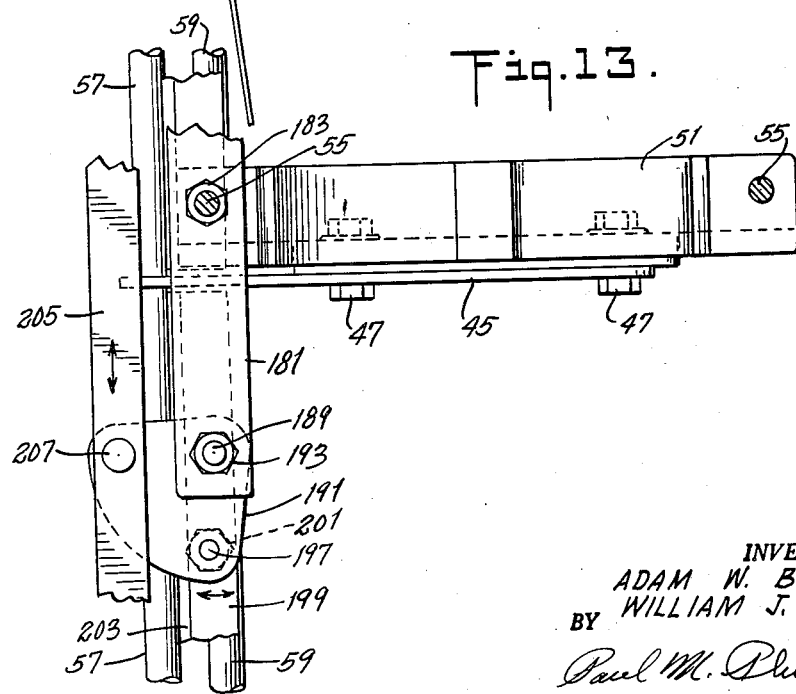

Sept. 25, 1962  A. W. BRUNNER ET AL  3,055,196
APPARATUS AND METHOD FOR MAKING PILE FABRIC
WITH VARYING HEIGHT OF PILE
Filed April 27, 1960  7 Sheets-Sheet 7

INVENTORS
ADAM W. BRUNNER
WILLIAM J. KOCH
BY
Paul M. Phillips
ATTORNEY

United States Patent Office 3,055,196
Patented Sept. 25, 1962

3,055,196
APPARATUS AND METHOD FOR MAKING PILE FABRIC WITH VARYING HEIGHT OF PILE
Adam W. Brunner, Hightstown, and William J. Koch, Wyckoff, N.J., assignors to Hightstown Rug Company, Hightstown, N.J., a corporation of Delaware
Filed Apr. 27, 1960, Ser. No. 25,068
18 Claims. (Cl. 66—84)

This invention relates to apparatus and a method for the manufacture of pile fabrics and more especially to the manufacture of pile fabrics in which loops of the pile yarn are disposed in the fabric in interengaging relation with body yarns of this fabric. The invention particularly relates to apparatus and a method for the manufacture of knitted pile fabrics with loops of the pile yarn knitted into the body structure of the fabric.

It has been proposed heretofore to produce knitted and woven pile fabrics of the type above mentioned with loops of the pile yarn disposed in the body of the fabric in interengagement with the body yarns of the fabric so as to produce a pattern or design by virtue of the tops of the loops standing above the body structure of the fabric at different elevations.

In certain machines of the prior art, tufted fabrics have been produced by projecting a needle through the body structure or web of the fabric which may be woven or a knitted fabric, the pile yarn being threaded through the eye of the needle and being carried to a constant distance on the opposite side of the web. To form loops of different heights, the rate of delivery of the pile yarn toward the needle has been varied at a selected point in the path of movement of the pile yarn lengthwise thereof. The combined effect of forming loops of the same height by penetration of the needle through the web a constant distance and the variation of the feeding of the yarn toward the web produces withdrawal of a portion of the pile yarn from the immediately preceding loop to draw this preceding loop down to a reduced height. The pattern is varied by suitable means engaging the pile yarn which selectively varies the feed of different pile yarns toward the respective needles.

In the patent to Crawford, 2,853,034, September 23, 1958, is disclosed a tufting machine for first forming a pile loop of predetermined maximum height by projecting a needle threaded with the pile yarn through a web of body yarns. The yarn is engaged by a member carried by a reciprocatable needle supporting means, this member moving with a constant stroke corresponding to that of the needle. The movement of this member is effected between two fixed spaced yarn guides so that the amount of movement transversely of the length of the yarn is a constant. Having regard to the varying amounts or increments of pile yarn fed by the feeding means in successive steps and the constant amount of yarn "stored" by the action of the reciprocatable member in its return movement between the two yarn guides transversely of the pile yarn, a variable amount of yarn is withdrawn from the loop just formed in the forward movement of the needle, the amount of yarn which remains in the loop after the needle is withdrawn from the web being equal to the length of the increment of the yarn which is fed. Thus the height of the pile loop in the finished fabric depends upon two factors which must be determined and controlled, namely, the variable amount fed in each of the successive steps of feeding and the constant amount of yarn "stored" in the length thereof between the yarn guides referred to.

It is an object of the present invention to provide apparatus and a method for making a pile fabric in which the actual height of the finished loops is positively and directly determined.

It is another object of the invention to provide improved apparatus and a method for forming each finished pile loop in the fabric as a loop of predetermined or maximum height without withdrawing pile yarn from a previously formed loop.

It is a further object of the invention to provide apparatus and a method for making a pile fabric in which a plurality of pile yarns may be fed in parallel relation to each other, as for example, by unwinding from a beam at a substantially constant rate, while providing for formation of pile loops of different heights in the fabric.

It is a still further object of the invention to provide a machine of simple construction in which a pile yarn engaging element is provided which is positively moved a predetermined variable distance, which determines the height of the finished loop. It is a feature of the invention that means are provided, the movement of which is effected positively for a selected distance, this means engaging the pile yarn so that a portion of the length thereof is moved a selected distance out of a given path between two spaced points, this distance corresponding to selected height of the finished pile loop to be formed in the fabric. The means for determining the effective height of the finished loop may include an element which engages the pile yarn and which is moved a distance such that the length of the path of the yarn between the two spaced points is increased relative to its initial length. This movement of the element is greater and less according as the selected height of the finished pile loop to be disposed in the fabric is less and greater, so as to effect withdrawal of pile yarn from a loop which is initially of a predetermined or constant maximum height to form the finished pile loop of selected height. In a simple embodiment of the machine of the invention the element referred to may be in the form of a heddle supported for movement lengthwise thereof and through the eye of which the pile yarn is threaded while extending about guide rods spaced apart in the general direction of movement of the yarn and constituting the two spaced points in the given path referred to. To effect the withdrawal of the pile yarn from the loop which is initially of predetermined maximum height which has been formed in the fabric, the heddle may be moved a greater or less distance transversely of the initial length of the yarn between the two guide rods.

It is a further feature of the invention, having regard to the positive displacement of a portion of the pile yarn from an initial path of its feeding movement between two spaced points, as above mentioned, that the feeding of the yarn and particularly the feeding of a plurality of pile yarns may be effected substantially continuously and at a predetermined average rate, which will permit the formation of the loops of desired different heights in a limited pattern area, these different heights being positively determined by the movement of the respective displacement means, such as heddles, selected distances corresponding to the selected heights of the finished pile loops to be disposed in the fabric. In certain of these fabrics, there is the same number of high and low loops for each pile yarn in each repeat of the pattern, so that the same total length of each pile yarn is used in each such repeat. Thus in such a fabric a plurality of pile yarns being fed for the purpose of forming in successive loops of different heights in the respective pile yarns may be fed from a beam containing all of the pile yarns wound thereon in parallel, the individual yarns from the beam passing through the eyes of the respective heddles and extending about the rods between which the heddles move, as above generally indicated. In other contemplated embodiments of the invention the pile yarns may be supplied from a creel or independent source for each such yarn or in groups, each having a number of pile yarns less than the whole number thereof.

As substantially all pile yarns have some predetermined elasticity, the movement by the heddle of the portion of the yarn out of its initial path will effect some elastic stretching of the yarn. The amount of such stretching, due to increasing the length of the path as above stated must be limited so as not to result in breaking of the yarn; but in any event is taken into account in determining the length of movement of the heddle to cause the pile yarn from a loop which is initially of predetermined or maximum height to be withdrawn, so that a loop of a selected height will remain in the fabric.

In some cases, however, it may be desirable to make the action more positive and to be independent of any possible stretching of the yarn particularly in the portion thereof between the heddle and the continuously moving feed rolls. In such cases, in accordance with another feature of the invention, means are provided for clamping the pile yarns at a location adjacent to the heddle and its cooperating rods. Preferably the pile yarns are clamped against the rod which is disposed with respect to the heddles nearer the feed rolls. Thus, the movement of the heddles is effective only to withdraw yarns from the loops of predetermined height. Since the heddles are disposed relatively closely to the loop forming means, the amount of stretch which occurs in the individual yarns between the loop forming means and the heddles is relatively small or negligible.

It will be understood from the above description that each heddle is effective to withdraw pile yarn directly from a loop of maximum height which has just been formed by an amount which may be between the limits of no withdrawal to leave a maximum height pile loop and a maximum withdrawal to leave a loop of minimum height. Moreover, such withdrawal of the yarn from the loop of initially maximum height is effected after the elements of the loop forming means which determine the height of the loop, such as the plush points of a pile forming device in a warp knitting machine, are moved out of the respective loops. This disengagement of the loop in a warp knitting machine, for knitting pile fabrics, occurs after the loop of predetermined maximum height has been anchored in the structure of the fabric, as by knitting the loop in with the body yarns of the fabric. This timing of the action of the heddles with respect to the withdrawal of the plush points is secured by virtue of a suitable operative connection between the means for forming the loops and for moving the plush points and the mechanism to be described which is effective to move the heddles the respective distances which determine the height of the finished loops.

The invention includes certain mechanical devices which will be described in connection with the drawings for accomplishing the purposes and functions above generally set forth for effecting the movement of the yarns from the portions of the path thereof between the two spaced points and for effecting the clamping of the yarn for more accurately and certainly controlling the amount of yarn withdrawn from the loops of predetermined maximum height. The invention also contemplates the use of electro-mechanical means for positively effecting movements of the heddles to displace the portion of the yarn between two points in the given path thereof.

Other objects and features of the invention will be understood from the description of the accompanying drawings, in which:

FIG. 3 is a view in elevation taken generally on line 3—3 of FIG. 1 and showing supporting means for the heddle moving devices and for their cooperating parts and including the drive means therefore;

FIG. 4 is a view in section on line 4—4 of FIG. 3 with some parts omitted;

FIG. 5 is a partial view in section on line 5—5 of FIG. 4;

FIG. 6 is a view in section on line 6—6 of FIG. 3;

FIG. 7 is a somewhat similar view in section on line 7—7 of FIG. 3;

FIG. 8 is a top view taken generally on line 8—8 of FIG. 7;

FIG. 9 is a view in elevation, with a portion broken away and in section, showing means for supporting the heddles in parallel closely adjacent spaced relation and the means for joining two adjacent sections of this supporting means;

FIG. 10 is a top view of the means cooperating with the heddle supporting means for clamping the pile yarns adjacent the heddles;

FIG. 11 is a view in elevation of the clamping means of FIG. 10;

FIG. 12 is a view in section on the line 12—12 of FIG. 11;

FIG. 13 is a plan view taken generally on line 13—13 of FIG. 12 showing a portion of the clamping means and of the means for effecting movement thereof;

Figure 1:
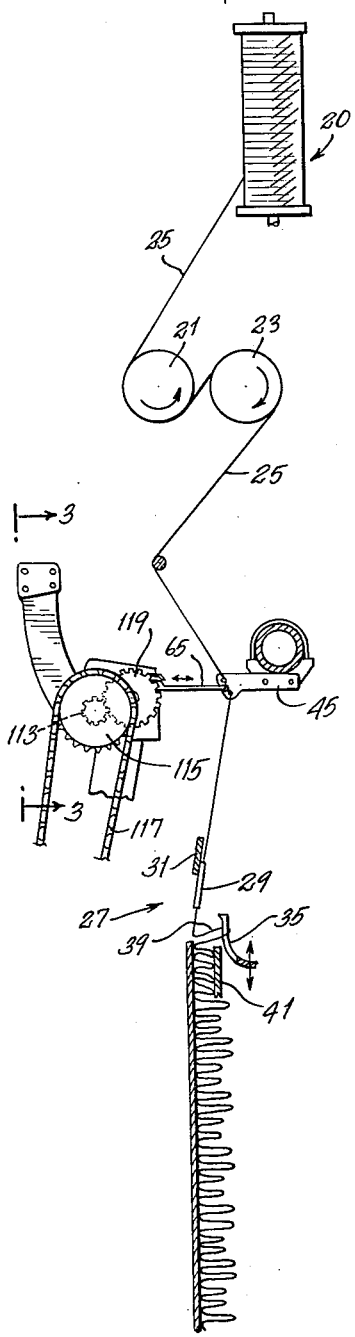
FIG. 1 shows diagrammatically a pile yarn being fed to the displacement means of this invention and from this means to a loop-forming zone of a warp knitting machine.

In FIG. 1 is shown a yarn container which may be a beam 20, upon which may be wound a plurality of pile yarns in parallel relation to each other, only one such yarn being shown for simplicity. These yarns may be fed in parallel as a sheet from the beam 20 by rotating the beam, or may be withdrawn from the beam by conventional means, which may include a pair of feed rolls 21, 23 about which each yarn 25 is passed, so that the rolls 21, 23 turning in the direction of the arrows may effect feeding movement of the yarns 25 toward the loop-forming zone 27.

Figure 2:
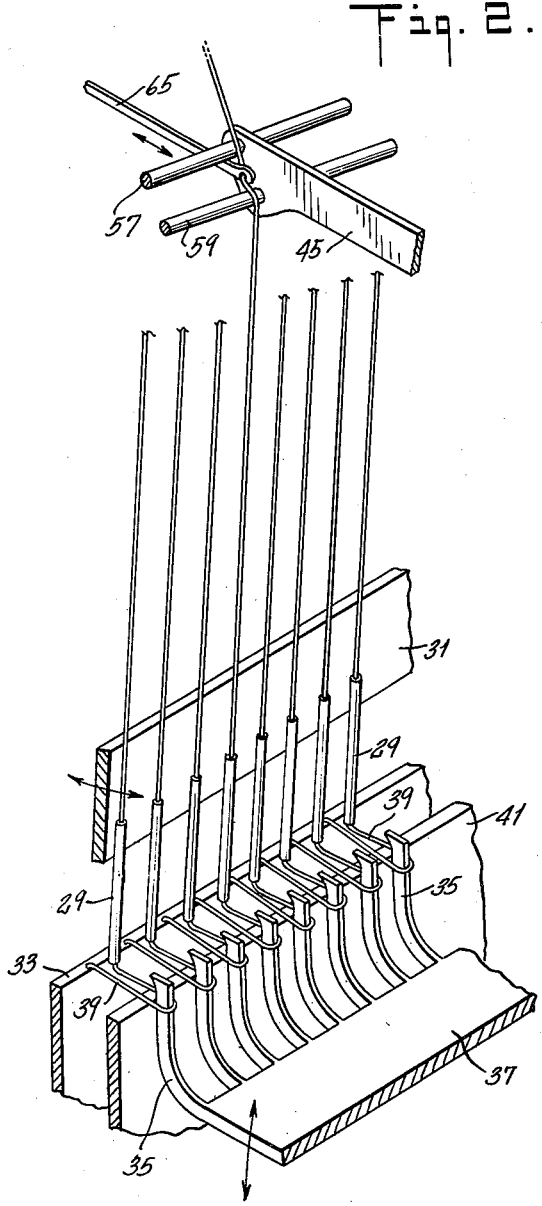
FIG. 2 is a view in perspective showing a loop forming means and a heddle engaging one of the yarns and cooperating with spaced guide rods for effecting displacement of the yarn to a path of increased length.

The devices of this loop forming zone in the embodiment being described in which the pile fabric being made is a knitted fabric, with the pile loops interengaging the body yarns of the fabric by virtue of the knitting operation, conventionally may include a plurality of tubes 29 carried by a tube bar 31, as shown in FIG. 2. The lower end of each tube is moved transversely of the fabric web 33 being forced to a point outwardly disposed from the fabric and beyond a respective plush point 35. The mechanism provides then for movement of the lower end of the tubes 29 generally parallel to the plane of the fabric 33 and around the plush point and then reversely toward and through the plane of the fabric to form loops 39 around the plush points 35 respectively. The plush points 35 are carried by a cross bar 37 which is movable as indicated by the double-ended arrow in FIG. 2 in a manner conventional in rug knitting machines. These loops are supported in conventional manner by a shield plate 41 until the plush points are withdrawn, the shield plate also protecting the formed loops in the fabric in the manner shown in FIG. 1 as the fabric moves downwardly upon the formation of successive loops. The paths and distances through which the lower ends of the tubes move all are the same and the disposition of the plush points is such that they are substantially in a common plane parallel to the plane of the web. The loops 39 thus formed are all initially formed of the same maximum or predetermined height.

In a conventional manner also and with mechanism which for clearness is not included in FIGS. 1 and 2, the loops thus formed are secured in the fabric by forming the next knitted stitch in the associated longitudinal warp knit chains of the fabric. When this anchoring of the formed loops of predetermined height is thus effected in a manner and by means now conventional in rug knitting machines, the plush points 35 are withdrawn from the respective loops, so that thereafter, in the manner to be described in connection with this invention, a selected part of the pile yarn contained in each loop may be withdrawn to form the finished loops of selected heights in the knitted fabric.

Disposed above the tube bar 31 in FIGS. 1 and 2 is a bracket 45, also shown in FIGS. 6 and 12, which is secured by bolts 47 slidable in slots 49 (FIG. 12) provided in a saddle member 51, which is secured to the underside of a rigid spanning member shown as a relatively large pipe or rod 53 which extends transversely of the machine and is generally parallel to the sheet of pile yarns 25. This pipe may be supported at suitable points in its length by frame members of the machine, not shown.

The saddle 51 is secured to the pipe or rod 53 by the U-bolt 55. A plurality of saddles 51 and U-bolts 55 are provided along the length of the pipe or rod 53 in order to support a plurality of brackets 45. At the outer left hand end of each bracket 45, as in FIGS. 1, 6 and 12, rods 57, 59 are supported extending parallel to each other and parallel to the sheet of pile yarns 25. The rods 57, 59 thus are supported at a plurality of points along their lengths, while leaving free the surface of these rods between the supporting brackets 45, so that the yarns 25 may pass over and in engagement with the rods 57 and 59 in the manner shown in FIGS. 1, 2, 6 and 12 as the yarns pass from the beam 20 to the loop forming zone 27. The rods 57 and 59 thus are disposed in spaced relation to each other along the path of movement of the pile yarns 25 lengthwise thereof toward the knitting zone.

Supported for movement lengthwise thereof by means hereinafter described and respectively associated with the pile yarns 25 are heddles 65, only one of which is shown in FIGS. 1 and 2, each heddle being provided with an eye 67 through which is threaded a pile yarn 25. Each heddle 65 and its supporting means may be disposed with respect to the bracket 45 so that the portion of the yarn 25 which may extend in a substantially straight line tangential to the circumferences of the rods 57, 59 passes through the eye 67 of the heddle when the heddle is in its extreme right hand position, as shown in FIGS. 1 and 6. As the heddle moves slightly toward the left, as shown in FIG. 6, the portion of the yarn which extends between the rods 57, 59 is diverted to a path of movement of increased length with respect to the straight line path between the tangent points on the rods 57, 59. This relation also is shown in FIG. 12. Upon continued movement of the heddle 65 to the left, the length of the yarn between the rods 57, 59 is continuously increased, the amount of such length of the longer path of the yarn thus depending upon the amount of movement of the heddle toward the left.

As will be understood from the description which follows, this amount of movement of each heddle and consequently the increased length of the path of the yarn between the rods 57, 59 is positively determined and is independent of the amount of yarn feeding movement effected by the rotation of the beam 20 and/or the feed rolls 21 and 23. It will be understood, therefore, that as the heddle 65 moves toward the left as seen in the drawings, the increased length of yarn required for the longer path between the rods 57 and 59 is provided to a substantial extent at least by withdrawing yarn from the loop 39 which just has been formed in the manner above described of predetermined or maximum height. According as the movement of each heddle is greater and less, the amount of yarn withdrawn from the loop 39 will be greater and less and the amount of yarn remaining in the finished loop remaining in the fabric will be less and greater.

While the relation of the rods 57 and 59 to the heddle and its eye 67 have been described for movement of the eye and the yarn engaged thereby from the position of the yarn in a straight line in tangent relation to the rods 57 and 59 toward the left as seen in FIGS. 1, 6 and 12, it will be understood that, by adjusting the position of the bracket 47 relative to the saddle 51 along the slots 49, the initial position of the portion of the yarn between the rods 57, 59 may be that shown in FIG. 12, for example, the initially engaged portion of the yarn 25 comprising two parts which are not aligned but in angular relation to each other as shown. Movement of the heddle 65 from this position as shown in FIG. 12 toward the left will increase the length of the yarn extending between the rods 57 and 59 in a path, the parts of which at either side of the heddle eye 67 are in more acute angular relation to each other than the initial position.

The means for effecting longitudinal movement of each heddle, which is about to be described, may be utilized for any suitable setting of the bracket 45 to dispose the rods 57, 59 in a desired relation to the eye 67 of the heddle. Preferably, however, the yarn 25 should engage the rods 57, 59 to determine an initial length thereof which is to be increased. In the embodiments shown in the present application, this increase of length is accomplished by movement of the heddle and its eye substantially transversely of the initial position of the yarn between the two spaced points provided by the rods 57, 59.

The means for supporting the heddles for their lengthwise horizontal movement in the embodiment being described is shown more particularly in FIGS. 3, 4 and 5. This means comprises a pair of bars 71 and 73 on the top planar surfaces of which the heddles are supported in sliding relation thereto. The heddles 65 are relatively thin and may be of rectangular section, as shown in FIGS. 2 and 5, so that a plurality of these heddles may be disposed in side-by-side, parallel, closely adjacent relation to each other for movement within channels 75 formed in the wall of a cylindrical member which may be provided by a tube 77 extending between and supported by brackets 79 and 81 secured respectively to frame members 83 and 85 of the knitting machine. The diameter of the tube 77 is such as to provide a rigid beam member spanning between the brackets 79 and 81. The diameter is such also as to provide a substantial arcuate extent for the channels 75, so that a substantial length of the heddles will be disposed in these channels for engagement with the walls 76 thereof which separate adjacent channels and the heddles therein. Thus, it will be understood that the weight of the heddles in the sliding movement thereof is supported by bars 71, 73 and that the walls 76 of the tubular member 77 guide the movement of the heddles in the reciprocating rectilinear movement thereof, horizontally in this embodiment, in order to move the eyes 67 of the heddles in the manner which has been described.

For the purpose of effecting the reciprocating movement of the heddles 65, these heddles are provided with a notched-out portion 87 providing a shoulder or cam surface 89. This cam surface is disposed in such relation to the length of each heddle which is disposed in the channels 75 provided by the walls 76 that movement thereof may be effected by a cam element 91 which may be structurally somewhat similar to the device commonly called a "pattern wire" in conventional knitting machines. The pattern cam element 91 in the present invention engages the heddle rather than the pile yarn itself (as a pattern wire) and, as a camming element cooperating with the shoulder or cam surface 89. This is effective during rotation of the cam carrier 93, formed as a hollow shaft and mounted for rotation within and about the axis of the tubes 77 to move the heddles toward the left as seen in FIG. 4 through a distance determined by the arc of movement of the cam element 91 from the time of its engagement of a portion thereof with the cam surface 89 and until the top edge of the cam element 91 passes below the bottom corner formed by the cam surface 89 and the bottom edge of the heddle as it slides on the bars 71 and 73. Thus, the amount of movement of the eye 67 of the heddle and, therefore, of the transverse movement of the portion of the yarn between the rods 57 and 59 is determined by the height of the positively moved cam element 91, a higher cam element portion moving the heddle a greater distance than a lower cam element portion.

It will be seen in FIG. 4 that a plurality of the cam elements 91 are supported on a cam carrier or hollow tubular shaft 93, which is supported by suitable bearing means within the tubular members 77 for rotation on the axis of the tubular members 77 as aforesaid. The cam carrier 93 supports a plurality of cam elements 91 disposed in circumferentially spaced relation and clamped to this cam carrier by means of plates 95 and screws 96 threaded in the shaft 93. These plates 95 are of wedge shape, the beveled edges thereof engaging complementary surfaces of the cam elements 91 to bind these elements in place and against the circumferential surface of the shaft 93 and with the top edges of these cam elements disposed at predetermined radial distances with respect to the axis of rotation of the shaft 93 depending on the height of different portions of the cam elements 91. The direction of rotation of the shaft 93 as shown in FIG. 4 is counterclockwise to effect the camming action which has been described.

As shown in FIG. 5, a cam element 91 may be provided at a portion 97 of its length with a height projecting substantially to the inner circumference of the tube 77. At another portion 99 of the length of the element 91 the height thereof may be substantially less than that of the portion 97. The lengths of the portions 99 may be such that these portions each span a plurality of heddles. It will be seen from a consideration of FIG. 4 that as the shaft 93 is rotated in the direction shown, the upper part of the portion 99 will not come into engagement with the cam surface 89 of any of the heddles 65; and, therefore, the heddles disposed along the length of the portion 99 of the cam element 91 will not be moved toward the left. On the other hand, the heddles disposed along the length of the portion 97 of the cam element 91 will be moved to a maximum extent. It will be understood further that, while in FIG. 5 only two heights respectively of the portions 97, 99 are shown, the cam element 91 may be formed with different intermediate heights, so that the respective heddles disposed along the lengths of such intermediate heights of the cam element will be moved distances which are intermediate between no movement and a maximum movement of the heddle. It will be noted further in FIG. 4 that successive cam elements 91 at portions thereof in the same plane perpendicular to the axis of rotation thereof may be of different heights, the high portions of elements 91 effecting maximum movement of the associated heddles and the low portions of the elements 91 effecting less movement or no movement of associated heddles. Thus, textures and pattern effects may be secured in the fabric by providing cam elements 91 of different contours along the length thereof for effecting different and selected amounts of movement of the respective heddles, so as to effect selected movements of the portions of the yarn between the rods 57 and 59, thus to withdraw selected amounts of yarn from the loops of predetermined height to determine selected heights of the finished loops in the fabric upon determined or pattern areas.

Means are provided to effect rotation of the cam carrier or shaft 93. A part of these means comprises a pinion shaft housing 101 secured by suitable fasteners, not shown, to the bracket 79 which is supported on the frame member 83, FIG. 3. This pinion shaft housing also is secured to a drive end bracket 103 by tap bolts 105, the drive end bracket 103 also being secured by cap screws 107 tapped into the upper face of the drive end bracket which is in engagement with the slide bars 71 and 73. The bars 71 and 73 are similarly secured by cap screws 107 to the respective brackets 79 and 81 and to at least one intermediate bracket 109 carried by the tube 77, as shown in FIGS. 3 and 4.

A pinion shaft 111 is shown in dotted outline in FIG. 3 within the pinion shaft housing 101, this shaft extending to the right as seen in FIG. 3 out through the drive end bracket 103 and having secured on its projecting end a pinion 113 as shown in FIGS. 1 and 3. The shaft 111 also carries on its projecting end a sprocket 115 about which runs a chain 117 driven by suitable mechanical drive (not shown) from another part of the machine, but which is synchronized with other operations thereof as herein set out.

The pinion 113 (FIGS. 1 and 3) meshes with a gear 119 carried on an extension 121 (FIG. 6) of the cam carrier 93, whereby, upon driving the chain 117, rotation is effected of the gear 119 and of the cam carrier 93 within the tubular member 77, so as to effect movement of the cam elements 91 successively into engagement with the cam surfaces 89 of the heddles at those portions of the cam elements that are of sufficient height to provide for such engagement, as described.

By means now to be described the heddles are biased toward the right in FIGS. 1, 4, 6 and 7 to effect return of the heddles to the initial position shown in FIG. 1 when the cam element 91 has passed out of engagement with the cam-engaging shoulders 89. Secured at intervals along the heddle supporting bar 71 by bolts 125, as shown in FIG. 7, are a plurality of pivot brackets 127 of arcuate form, which extend about an open space providing for disposition of a pusher bar 129 extending across the machine parallel to the axis of the cam carrier 93 and so as to be in engagement with the left hand ends (see FIG. 7) of all of the heddles when these heddles are moved toward the left by the cam elements 91 carried by the cam carrier 93 as described. The pusher bar 129 is secured to a plurality of spaced pusher levers 131 which are supported for pivotal movement about pins 133 secured in the upper part of the respective pivot brackets 127 and all in axial alignment across the machine. It will be understood, since the pivot brackets 127 are fixed with respect to the bar 71 and, therefore, with respect to the machine frame, and as the pivot pins 133 are stationary and in alignment in the brackets 127, that the pusher levers 131 and the pusher bar 129 carried thereby may move as a unit about the common axis of the pins 133. Clockwise movement of the pusher bar 129 and of the pusher levers 131 about the axis of the pins 133 as seen in FIG. 7 may be effected by movement of one or more of the heddles 65 toward the left when actuated as aforesaid by a cam element 91.

Such movement is effected against the bias of a plurality of tension springs 135, each engaging at its left end as seen in FIG. 7 a pin 137 carried by a part of one of the pusher levers 131 located below the pivot pin 133 and at its right end engaging a normally stationary pin 139 disposed toward the right hand end of a cover hinge bracket 141, each of which also is pivotally supported on one of the pins 133. A cover bracket 141 is provided for each pivot bracket 127 respectively, the hub of the cover hinge bracket 141 surrounding the pivot pin 133 being disposed between two bosses 145 provided on each pivot bracket, as shown in FIG. 8. Two of these pivot brackets 127 are shown in FIG. 3 supported on the bar 71.

Each cover hinge bracket 141 is of such form as to provide a generally planar surface, which may be disposed parallel to the upper faces of the bars 71 and 73 and at a distance therefrom, such that the lower face of a cover plate 147 secured to the lower face of each bracket 141 is spaced above the upper surface of the bars 71 and 73 at a distance slightly greater than the depth of the heddles, so as to provide clearance for the free sliding movement of the heddles on the bars 71 and 73, the cover plate 147 holding all of the heddles 65 in their respective channels 75. The cover plate 147 may be of a metal suitable for sliding engagement with the heddles.

The cover hinge bracket 141 also carries on its outer right hand end FIG. 7 a rigid stop strip 149 which may be made of a metal and which is lined at its underside with a strip of plastic material 151 disposed between the upper face of the end cover plate 147 and the lower face of the stop strip 149. The stop strip 149 and the plastic strip 151 are secured to the face of a recess at the end of the cover hinge bracket 141 by screws 153, which also secure the cover plate 147 to the cover hinge bracket 141, additional screws 153 being provided as shown for securing other portions of the plate 147 to the bracket 141.

It will be understood from the description given, having regard to the weight of the cover hinge bracket 141, of the plate 147, of the stop strip 149 and the plastic strip 151 attached thereto, that this assembly will tend to move downwardly about the pin 133, so that the under face of the plate 147 is closely adjacent to or bears on the top edges of the heddles 65. Each spring 135 also tends to produce clockwise movement of the associate cover hinge bracket 141 about the axis of pin 133, while also tending to produce counter clockwise pivotal movement (as seen in FIG. 7) of the pusher lever 131 and of the pusher bar 129. When the cover plate 147 is thus adjacent to or in engagement with the top edges of the heddles, these heddles are confined for movement toward the left. Such movement (to the left, FIG. 7) will effect the pivotal movement of the pusher bar 129 and the pusher levers 131 clockwise (as seen in FIG. 7) against the bias of the springs 135. The return movement of the heddles 65 under the bias of the springs 135 will tend to bring the sloping edges 66 of the heddles 65 into engagement with the plastic strip 151. The disposition of the plastic strip with respect to these sloping edges may be such, having regard also for the adjustability of the brackets 45 on the saddle members 51, that the eyes 67 of the heddles will become disposed substantially on the straight line path substantially tangent to the rods 57 and 59 when the sloping edges 66 abut the plastic strip 151.

Each pivot bracket 127 is provided with an extension arm 155 (FIG. 8) having a hub 157 at its outer end, in which is removably secured a pin 159, which extends through a hub 161 formed on the cover hinge bracket 141, the hub 161 being provided with a slotted hole 163 to receive the pin 159 so as to provide for slight pivotal movement of the cover hinge bracket 141 and, therefore, of the plate 147, the stop strip 149 and the plastic strip 151 with respect to the heddles 65. The pin 159 in engagement with the slot 163 further serves to prevent inadvertent lifting of the cover plate 147 during operation of the machine, so as to prevent accidental disengagement of the heddles from their channels. The cover hinge brackets 141 and the parts carried thereby, however, may be lifted in pivoting movement on pins 133 so as to afford access to the individual heddles upon removal of the pins 159.

Means of novel design are shown in FIGS. 7 and 9 which provide for securing sections of the tube 77 together where this tube, because of its long length for a given installation, is made in a plurality of sections. As shown in FIG. 9, the left hand section of the tube 77 may be formed with a shoulder 165 at its right hand end for engagement with a substantially complementary projecting shouldered part 167 formed on the left end of the right hand section 77. When the sections are put together with the parts 165 and 167 suitably telescoped, the adjacent channels 75 will be maintained in properly spaced relation.

The two sections 77 are shown held together by means of three screws 169, FIGS. 7 and 9, of which one is shown in FIG. 9. Each screw 169 is freely rotatable in and slidable along a hole 171 in a right hand lug 173 (as seen in FIG. 9) and its threaded portion engages a threaded hole 175 in a left hand lug 177 (as seen in FIG. 9) carried by the other member 77. The lugs 173 and 177 are secured to the respective sections 77 by being formed with dovetails which are inserted in dovetail slots 179 cut in the walls of the respective tubular sections 77 in a direction generally transverse to the axis of the sections 77. As may be seen in FIGS. 7 and 9, three such joining devices may be disposed in peripherally spaced relation about the axis of the tubes 77.

In FIGS. 10 to 13 are shown the means for clamping the pile yarns at points adjacent to the heddles and at the side of the heddles disposed toward the beam or other supply of pile yarn. These means may be carried by the pipe or rigid supporting member 53 and the saddle members 51 secured to this pipe by the U-bolts 55 as above described. As shown in these figures a supporting bar 181 is disposed adjacent to and extending at either side of each U-bolt 55 at the side of the pipe or supporting member 53 disposed toward the heddle supporting structure. These bars 181 may be held in position by nuts 183 and 185 threaded on a straight portion of each U-bolt 55 respectively, the nuts 183 being disposed in engagement with the upper surfaces of the bars 181, FIGS. 10 and 13. These bars 181 also may rest on the upper planar face of the saddles 51, the lower nuts 185, FIG. 11, cooperating also to secure the U-bolts to the saddles. If desired, as the bars 181 are disposed adjacent to the circumference of the pipe or supporting member 53, they also may be secured thereto by tack welding as indicated at 187, FIGS. 10 and 12, so as to hold the bars 181 rigidly in horizontal position.

Supported on pivot pins 189 as shown in FIGS. 10 to 13, which extend through the bars 181 are bell crank members 191. Nuts 193 are threaded at the upper and lower ends of each of the pins 189 to hold the bell crank members 191 in place for pivoting movement on the pins 189.

Threaded in hubs 195 carried by the right hand portion of the respective bell crank members 191 as seen in FIGS. 10 and 11 and extending downwardly therefrom are studs 197, which have lower threaded portions extending through a channel member 199, FIG. 12, secured in place on the studs 197 by nuts 201. The channel member 199 carries therein a strip 203 of plastic or similar resilient material as rubber which has a rounded surface disposed adjacent to the transverse rod 57 for movement into and out of gripping engagement with the yarns 25 which pass over this rod. In some instances it may be found desirable that the rod 57 have longitudinal corrugations thereon or other knurling or roughening and/or that the rounded plastic strip 203 be similarly formed or in some instances perhaps formed to a complementary shape, so as surely and certainly to grip the pile yarns between these members when the strip 203 is forced to the position shown in FIG. 12. This modification, which is not specifically illustrated in the drawings, is to be considered within the purview of the present invention.

To the outwardly extending portion of each bell crank member 191, FIGS. 10 and 12, a continuous connecting bar 205 is pivotally connected by means of pins 207. As may be seen in FIGS. 10 and 13, movement of this connecting bar 205 toward the left in FIG. 10 and upwardly in FIG. 13 will effect clockwise movement of each bell crank member 191, which will in turn cause the studs 197 and the channels 199 supported thereby to move toward the left as seen in FIGS. 12 and 13. This movement will move the plastic strip 203 toward the rod 57. Thus by suitable adjustment of the brackets 45 and with proper disposition of each bar 181 and of the bell crank members 191, the rounded (and smooth or roughened) edge surface of the plastic strip 203 will be brought into gripping engagement with the yarns 25 to press these yarns against the circumference of the rod 57 with such pressure as will hold the pile yarns at this place against movement lengthwise thereof, thus to provide for the withdrawal of the yarn from a previously formed loop of predetermined height upon movement of the heddle 65 toward the left as seen in FIG. 12 and as previously described. Reverse movement of the connecting bar 205 toward the right, FIGS. 10 and 11, will cause counterclockwise rotation of the bell crank member 191, as seen in FIGS. 10 and 13, to effect release of the pile yarns for the free forming of a next loop from each such yarn.

Such release of the pile yarns is effected at the proper time to provide for movement of the yarns 25 which in the interval have been fed by the rolls 21 and 23 toward the loop forming zone to provide the requisite amount of yarn for the next action of the tubes 29 and the plush points 31 as hereinbefore described. After a loop is formed from each pile yarn, the connecting bar 205 again is moved toward the left as seen in FIGS. 10 and 11 to effect clockwise movement of the bell crank members 191, to bring the plastic strip 203 again into engagement with the yarns passing over the rod 57.

In order to accomplish the movement of the bar 205 and of the channel 199 in proper relation to the feeding movement of the yarns and to provide the desired interval between successive clamping actions upon the yarns, automatic means such as are shown in FIGS. 10 and 11 may be utilized. These means may comprise a cam shaft 211 shown at the left, FIGS. 10 and 11, which may be driven in a predetermined timed relation to the other operating parts of the machine and is driven in synchronism with the feed rolls 21 and 23. The shaft 211 carries a cam 213 shown as having a high portion 215 on its circumference which, upon rotation of the cam 213, comes into engagement with a roller 217 rotatably carried on the end of a substantially horizontally extending arm 219 of a bell crank, the upwardly extending arm 221 of which is connected by a suitable connector 223 threaded on a rod 225, which is pivotally connected to the connecting bar 205. It will be apparent, upon rotation of the cam member 213 in a counterclockwise direction, FIG. 11, that the horizontal arm 219 of the bell crank will be lifted and the arm 221 thereof will be moved toward the right as seen in FIGS. 10 and 11 to effect the movement of the connecting bar 205 toward the right. At the opposite side of the machine i.e., (at the right as seen in FIGS. 10 and 11) is a similar cam member 214 having a high portion 216 and supported on a shaft 212 suitably journalled in the machine frame for rotation about the axis of the shaft 212, which is also driven in synchronism with the working parts of the machine and with the cam shaft 211. In the movement of the connecting bar 205 toward the right, a threaded connecting rod 226 will effect movement of the upwardly extending bell crank arm 222 toward the right and a downward movement of the substantially horizontal arm 220 at this side of the machine. It will be understood, if the cam member 214 is rotated in the clockwise direction at this side of the machine, that when the high portion 216 of this cam reaches the upper side of its path, it will come into engagement with a roller 218 and effect upward movement of the horizontally extending arm 220, so as to effect return movement of the connecting bar 205 to the position shown in FIG. 11 from which it may again be moved toward the right when the high portion 215 of the cam member 213 again reaches the upper position for engagement with the roller 217. It thus will be apparent that movement of the plastic strip 203 against and away from the yarns will be effected in timed relation to the feeding of the yarns and to the forming of the loops in the loop forming zone. This may be accomplished by providing a suitable ratio in the drive and suitable cam configuration for the cams 213 and 214 to provide for the clamping of the yarns after the loops are formed and the plush points are withdrawn so that the heddles may effect withdrawal of the pile yarn from the loops of predetermined height.

It will be understood that if desired the mechanism could be suitably rearranged so that a cam on each side of the machine, corresponding to the cams 213 and 214, could act to pull the bar 205 toward the side actuated by the cam rather than to push the bar away from such sides respectively as in the form shown in the drawings and particularly described. Furthermore, it is contemplated a single track-type cam could be used to move the bar and could be located on either side of the machine. It is believed, however, that in a relatively wide machine, the provision of cams or actuating means on each side provides a more positive type control than could be effected by any type of cam-actuating means on one side only.

Figure 14:
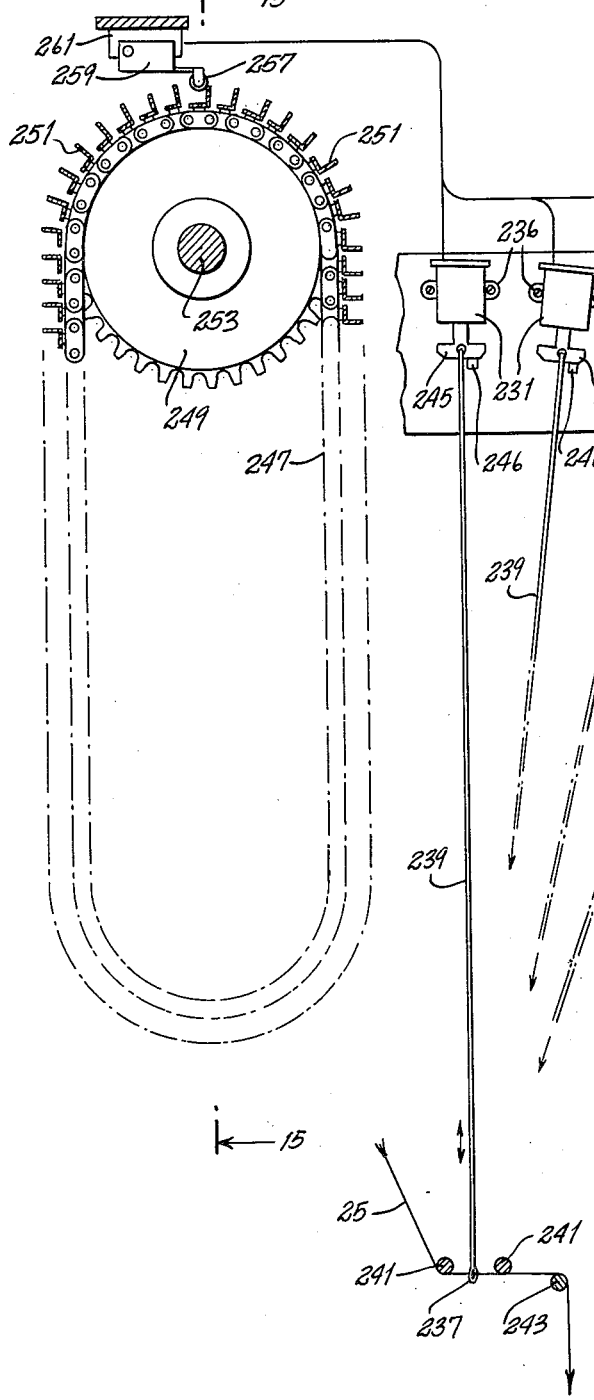
FIG. 14 shows an electro-mechanical modification of the means for effecting the movements of the heddles.
Figure 15:
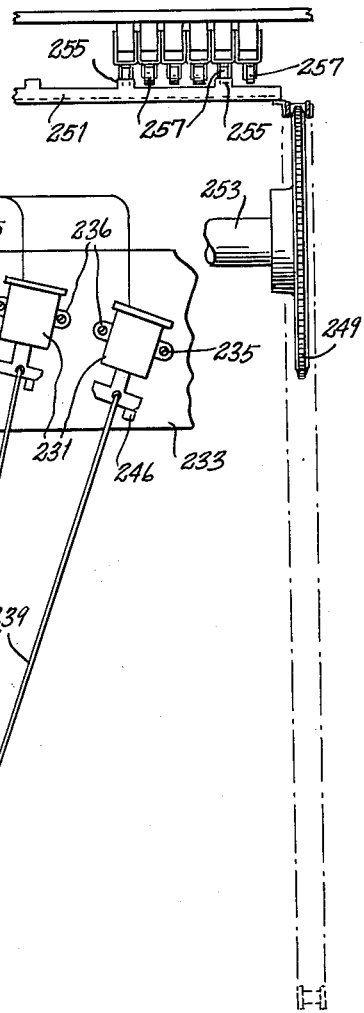
FIG. 15 is a section taken on line 15—15 of FIG. 14.

FIGS. 14 and 15 show a modification of the means for effecting movement of the heddles to effect the increase in the length of the path of the pile yarns between two points which is utilized to effect the withdrawal of pile yarn from the loops which are formed initially of predetermined height. As shown in FIG. 14 a plurality of solenoids 231 are arranged in a convenient disposition and supported by a frame member 233, to which they may be secured by bolts 235 passing through lugs 236. The axes of these solenoids in this arrangement are disposed radially with respect to a line perpendicular to the paper in FIG. 14 upon which line the eyes 237 of all of the heddles are disposed in their inoperative position, successive heddles 239 of any group being angularly offset about the line of the eyes 237. The support 233 may extend somewhat at an angle to the plane of the paper in order to dispose the adjacent solenoids of a group 231 as required to effect the result aforesaid with the eyes 237 of the associated heddles closely spaced along the line perpendicular to the paper at a point adjacent to the rods 241 beneath which the yarns 25 are passed and in contact with which the yarn extends substantially horizontally as shown in FIG. 14. In order to direct the yarn toward the loop forming zone, an additional rod 243 may be disposed to the right of the right hand rod 241 as shown in FIG. 14.

The upper ends of the heddles may be bent over and hooked loosely through holes in or otherwise suitably connected to the heads 245 of the solenoid armatures so that, when a solenoid 231 is energized, the associated armature will be drawn up and the heddle 239 connected thereto will be lifted to increase the length of the path of the associated pile yarn, so as to effect the withdrawal of the yarn from a pile loop of predetermined height in the manner which has been described above. When the solenoid is deenergized, the weight of the armature and the associated heddle will cause it to fall and will carry the heddle downwardly again to dispose the eye 237 in the initial position shown substantially on the horizontal line between the two rods 241. Suitable stops 246 may be provided to limit the downward movement of the armatures and of the heddles.

In order to effect energization of the respective solenoids in the proper timed relation, so as to lift the heddles to withdraw yarn from the pile loops as aforesaid, a camming device may be provided in which endless chains 247 extend over sprockets 249 and are pendent therefrom. The chains 247 carry a plurality of closely spaced angle members 251 having their bottom flanges secured to the several chains and the other flanges upstanding with respect thereto. The upstanding flanges of the angle members 251 move on a circle about the center of a shaft 253 upon which all the sprockets 249 are secured for rotation therewith. The upstanding flanges of the angle members 251 may be formed, as shown in FIG. 15, with projecting cam elements 255 disposed therealong in positions such that, as each angle member reaches the top of the circle, the cam elements 255 thereof engage rollers 257 which are carried by pivot elements 259 of microswitches 261. It is contemplated that if desired cam members having suitable shapes may be removably secured to the upstanding flanges of the angles 251 so that the pattern being formed of high and low loops may be varied at will. Also by reason of the relatively long chains 247, a pattern may be used which has a very substantial length before this pattern is repeated in the fabric being formed. These microswitches 261 are connected in circuit with a suitable electrical supply and with the coils of the respective solenoids 231, so that, upon the closing of a given microswitch, the corresponding solenoid is energized to raise the associated heddle 231, thus to increase the length of the path of the pile yarn between the rods 241. When the cam element 255 on a given angle member 231 has passed the roller of the particular microswitch, the corresponding solenoid is deenergized to allow the heddle to fall.

It will be noted in FIG. 15 that the portion of the upstanding flange of the angle member 251 there shown is cut away between the cam elements 255, so that the microswitches in line with the portion between the cam elements are not actuated. The heddles associated with these unactivated switches, therefore, are not lifted and the pile yarn loops of predetermined or maximum height which are formed retain this height, no yarn being withdrawn therefrom. Thus, a fabric having pile loops of maximum height and pile loops of minimum height may be made with the device of FIGS. 14 and 15.

Modifications may be made of the particular means disclosed which are utilized to accomplish the positive movement of a portion of the pile yarn as it is moved toward the loop forming zone to increase the length of the path of this portion and particularly to effect movement of this portion transversely of a given path between two spaced points therealong, so that the withdrawal of the yarn from the loop of initially predetermined or maximum height is positively effected. All such modifications for carrying out the method and the action which have been described are intended to be within the scope of the invention as defined in the claims appended hereto.

What is claimed is:

1. In a machine for producing a pile fabric having pile loops of different heights formed of pile yarns interengaged with body yarns of said fabric, the combination with means for feeding a plurality of pile yarns to a loop forming zone disposed adjacent to a formed portion of said fabric, and means in said zone for initially forming the respective pile yarns fed thereto into loops all of which are of a predetermined maximum height; of means individual to each of said pile yarns for retracting yarn from the respective pile loops of maximum predetermined height, and means operatively connected to the respective retracting means for effecting movement of the respective retracting means different respective distances that are greater and less according as selected heights of the finished loops to be interengaged in said fabric respectively are less and greater, so as to effect the formation of said finished loops of selected heights from said loops of predetermined maximum height.

2. A machine for making pile fabric in accordance with claim 1, in which said means for retracting yarn from the respective pile loops comprises means individual to each pile yarn respectively for effecting movement of a portion of such pile yarn transversely of its path of movement.

3. In a machine for producing a pile fabric having pile loops of different heights formed of pile yarns interengaged with body yarns of said fabric, the combination with means for simultaneously feeding a plurality of pile yarns disposed in generally parallel side-by-side relation to each other and substantially at the same rate to a loop forming zone disposed adjacent to a formed portion of said fabric, and means in said zone for forming the respective pile yarns fed thereto into pile loops of initially substantially the same predetermined height, said rate of feeding of said yarns being in a predetermined relation to the sum of the lengths of pile yarn required for a predetermined number of successive loops formed from each of said pile yarns, whereby the length of yarn required for forming the loops of the respective pile yarns delivered in parallel is the same within each pattern repeat; of means individual to each of said pile yarns and respectively engaging said pile yarns for retracting yarn from the respective pile loops of predetermined height, and means operatively connected to the respective retracting means for effecting movement of the respective retracting means by different respective distances that are greater and less according as selected heights of the finished loops interengaged in said fabric respectively are less and greater, so as to effect the formation of said finished loops of selected height from said loops of predetermined height.

4. In a machine for producing a pile fabric having pile loops of different heights formed of pile yarns interengaged with body yarns of said fabric, the combination with means providing a supply of pile yarns, and means for withdrawing pile yarns from said supply and concomitantly forming therefrom loops which are initially of a predetermined height; of means for disposing each said pile yarn as it is withdrawn from said supply with an extent thereof along a path of given length between two fixed points, yarn retracting means individual to each of said pile yarns for engaging said pile yarns in their paths between said two points for effecting retractive movement of the engaged portion of said yarns so as to cause the engaged portions of said yarns to follow paths of varying increased lengths between said two points, and thereby retracting some of the yarns from said loops of predetermined height, so as variably to reduce the height of some of said loops.

5. A machine for producing a pile fabric as defined in claim 4, in which said engaging means for each yarn respectively is an elongated heddle, and means supporting each said heddle for movement thereof lengthwise thereof in a rectilinear path to effect the movement of a portion of said pile yarn to dispose said portion in a path of increased length between said two points.

6. In a machine for producing a pile fabric having pile loops of different heights formed of pile yarns interengaged with body yarns of said fabric, the combination with means providing a supply of pile yarns, and means for withdrawing pile yarns from said supply and concomitantly forming therefrom loops which are initially of a predetermined height; of means for disposing each said pile yarn as it is withdrawn from said supply with an extent thereof along a path of given length between two fixed points, a heddle engaging each of said pile yarns respectively in their paths between said two points for effecting movement of the engaged portions of the pile yarns, so as to cause the engaged portions of said yarns to follow paths of increased lengths between said two points, and thereby retracting some of the yarns from said loops of a predetermined height so as to reduce the height of some of said loops, a cam follower portion formed on each of said heddles, and cam means constructed and arranged for movement into engagement with the cam follower portions of said heddles for effecting rectilinear movement of said heddles by amounts determined by the configuration of said cam means and thereby for forming said loops to selected heights determined by said configuration.

7. A machine for producing a pile fabric in accordance with claim 6, in which said cam means comprises elements supported for movement so as to engage said heddles in succession, said cam elements having selected different configurations, so as to form loops from said pile yarns which have heights as determined by the configurations of said cam elements respectively, there being one of said cam elements for each transverse row of pile loops in the completed fabric.

8. In a machine for producing a pile fabric having pile loops of different heights formed of pile yarns interengaged with body yarns of said fabric, the combination with means for simultaneously feeding a plurality of pile yarns disposed in generally parallel side-by-side relation to each other to a loop forming zone disposed adjacent to a formed portion of said fabric, and means in said zone for forming the respective pile yarns fed thereto into pile loops which are initially of substantially the same predetermined height; of means for engaging said plurality of said pile yarns for holding them at a given point against movement toward said loop forming zone, means individual to each of said pile yarns and respectively engaging said pile yarns between said holding means and said loop forming zone for selectively retracting yarn from respective pile loops of predetermined heights, means operatively connected to said retracting means respectively for effecting movement of the respective retracting means respective distances that are greater and less according as selected heights of the finished loops interengaged in said fabric respectively are less and greater, so as to effect the formation of said finished loops of selected heights from said loops of predetermined height.

9. In a machine for producing a pile fabric, the combination as defined in claim 8, in which said holding means comprises means for gripping said plurality of pile yarns in common and holding them against movement at a predetermined point for each said pile yarn, actuating means operatively connected to said gripping means and constructed and arranged so as to effect the gripping thereof after the formation of a set of said loops of predetermined height and prior to said movement of said retracting means, and to effect the release thereof after said movement of said retracting means and prior to the formation of a next set of said loops of predetermined height from said pile yarns.

10. In a machine for producing a pile fabric, the combination as defined in claim 9, in which said gripping means comprises an elongated member extending transversely of said machine, means mounting said elongated member for reciprocating movement into and out of engagement with said plurality of pile yarns, and cam actuating means for said elongated member to cause it to operate as aforesaid.

11. In a machine for producing a pile fabric having pile loops of different heights formed of pile yarns interengaged with body yarns of said fabric, the combination with means for simultaneously feeding a plurality of pile yarns in generally parallel side-by-side relation to each other to a loop forming zone disposed adjacent to a formed portion of said fabric, and means in said zone for forming the respective pile yarns fed thereto into pile loops initially of substantially the same predetermined height; of elongate heddles respectively supported for movement lengthwise thereof and respectively engaging said pile yarns, said heddles being arranged in parallel side-by-side relation to each other, means providing a plurality of parallel channels respectively receiving said heddles therein for separately guiding said heddles in said lengthwise movement thereof, means for selectively effecting longitudinal movement of said heddles respectively to effect diverting movements of portions of the respectively engaged pile yarns, so as to dispose said portions respectively in paths of increased length and thereby selectively retracting pile yarn from the respective loops of predetermined height to form loops of lesser heights, and a plurality of cam means constructed and arranged to be sequentially operatively connected to said heddles for effecting said lengthwise movements thereof by different distances for the respective heddles which are greater and less according as selected heights of the respective finished loops interengaged in said fabric respectively are to be formed less and greater, so as to effect the formation of finished loops of selected heights from said loops of predetermined height.

12. In a machine for producing a pile fabric, the combination as defined in claim 6, wherein said cam means comprises a movable cam carrier, means on said cam carrier for removably securing thereto a plurality of cams adapted for use in forming at least one complete repeat of the pattern thereof, and means for moving said cam carrier to bring said cams successively to an operative position, at which one of said cams is in position to be engaged by the cam follower portions of each of said heddles for each row of the fabric.

13. In a machine for producing a pile fabric having pile loops of different heights formed of pile yarns interengaged with body yarns of said fabric, the combination with means for feeding a plurality of pile yarns to a loop forming zone disposed adjacent to a formed portion of said fabric, and means in said zone for initially forming the respective pile yarns fed thereto into loops, all of which are of a predetermined maximum height; of means individual to each of said pile yarns for retracting yarn from the respective pile loops of predetermined maximum height, and means operatively connected to the respective retracting means for effecting movement thereof when loops of less than said predetermined maximum height are desired, so that pile loops of at least two different heights may be formed by selective movement of certain at least of said retracting means.

14. A machine for forming pile fabric having pile loops of two different heights in accordance with claim 13, in which each pile yarn extends from a supply point therefor to the loop forming zone in a path predetermined for each said pile yarn and including a portion extending past two fixed points; in which said means individual to each pile yarn for retracting yarn from respective pile loops comprises heddles, one of which engages each pile yarn respectively between said two fixed points, said heddles being movable, so as to cause the yarn in traveling between said two fixed points to travel a path of increased length and thereby retracting yarns in accordance with the respective positions of said heddles so as to reduce the height of some of said loops, a solenoid operatively connected to each of said heddles for effecting yarn retracting movement thereof upon the actuation of each said solenoid, and means for selectively controlling the electric current supplied to said solenoids respectively, so as to produce a predetermined desired pattern of low and high loops in the finished fabric.

15. In a machine for producing a pile fabric, the combination as defined in claim 14, in which said means for selectively controlling the supply of electric current to said solenoids comprises cams, one for each row of pile loops in at least one repeat of a predetermined pattern of said fabric, and switch means individual to each of said solenoids and constructed and arranged to be actuated by said cams for controlling the electric current supply to said solenoids respectively.

16. The method of producing a pile fabric, which comprises the steps of feeding a pile yarn in a given path toward a loop forming zone adjacent to a fabric which also comprises interengaging body yarns, forming in said loop forming zone a loop of said pile yarn which is initially of predetermined maximum height, retracting from zero up to a selected amount of pile yarn from said loop subsequent to the complete formation thereof as aforesaid and prior to forming a next loop from the same pile yarn by then diverting a portion of said pile yarn extending between two fixed spaced points along said path by a variable amount, which amount is greater as the height to which said loop is to be formed is less.

17. The method of producing a pile fabric, which comprises the steps of feeding a pile yarn in a given path toward a loop-forming zone adjacent to a fabric which also comprises interengaging body yarns, forming in said loop-forming zone a loop of said pile yarn which is initially of a predetermined maximum height, thereafter temporarily holding said pile yarn against movement toward said loop-forming zone by engaging a portion of said yarn at a point spaced from said zone, and during such holding diverting by variable amounts the portion of said pile yarn extending between two points along said path between the portion of said yarn which is held as aforesaid and said loop-forming zone, and thereby retracting from zero up to a selected amount of said pile yarn from the loop formed thereby subsequent to the complete formation of said loop and prior to the forming of the next loop from the same pile yarn, and then releasing the held portion of said pile yarn for the supply of additional yarn to said loop forming zone for the formation of a next succeeding loop from said pile yarn.

18. The method of producing a pile fabric in accordance with claim 17, in which a plurality of pile yarns are fed at a single constant rate and in side-by-side relation, and in which the process as defined in claim 17 is carried on selectively as to each of said pile yarns, so that loops made from different pile yarns may be selectively caused to be formed to different heights.

References Cited in the file of this patent
UNITED STATES PATENTS

| | | |
|---|---|---|
| 2,155,385 | Amidon | Apr. 25, 1939 |
| 2,331,290 | Amidon | Oct. 12, 1943 |
| 2,944,412 | Rice | July 12, 1960 |
| 2,944,413 | Rice | July 12, 1960 |
| 2,949,755 | MacCaffray | Aug. 23, 1960 |
| 2,959,947 | MacCaffray | Nov. 15, 1960 |
| 3,001,388 | MacCaffray | Sept. 26, 1961 |
| 3,019,625 | Hubbard | Feb. 6, 1962 |